United States Patent
Delegue et al.

(10) Patent No.: US 7,590,062 B2
(45) Date of Patent: Sep. 15, 2009

(54) CORRELATING END-TO-END PASSIVE MEASUREMENTS USING HIERARCHICAL FILTERS

(75) Inventors: Gerard Delegue, Cachan (FR); Olivier Martinot, Draveil (FR); Stéphane Betge-Brezetz, Paris (FR); Emmanuel Marilly, Saint-Michel-sur-Orge (FR); Mohamed Adel Saidi, Antony (FR); Sylvain Squedin, Nozay (FR)

(73) Assignee: Alcatel, Paris (FR)

( * ) Notice: Subject to any disclaimer, the term of this patent is extended or adjusted under 35 U.S.C. 154(b) by 696 days.

(21) Appl. No.: 11/113,991

(22) Filed: Apr. 26, 2005

(65) Prior Publication Data

US 2005/0238017 A1    Oct. 27, 2005

(30) Foreign Application Priority Data

Apr. 27, 2004    (FR) .................................. 04 50792

(51) Int. Cl.
*H04J 1/16* (2006.01)
(52) U.S. Cl. .................................... 370/230.1; 370/252
(58) Field of Classification Search .......... 370/241–253
See application file for complete search history.

(56) References Cited

U.S. PATENT DOCUMENTS

| | | | |
|---|---|---|---|
| 6,768,715 B2 * | 7/2004 | Hsu et al. | 370/229 |
| 7,421,564 B1 * | 9/2008 | Rahim et al. | 711/219 |
| 2002/0163902 A1 * | 11/2002 | Takao et al. | 370/338 |
| 2003/0105856 A1 * | 6/2003 | Tse et al. | 709/224 |
| 2003/0117969 A1 * | 6/2003 | Koo et al. | 370/318 |
| 2003/0135612 A1 | 7/2003 | Huntington | |
| 2006/0166687 A1 * | 7/2006 | Edman | 455/502 |
| 2007/0171840 A1 * | 7/2007 | Kim et al. | 370/252 |

* cited by examiner

*Primary Examiner*—Ricky Ngo
*Assistant Examiner*—Kan Yuen
(74) *Attorney, Agent, or Firm*—Sughrue Mion, PLLC

(57) ABSTRACT

A system (DGM) is dedicated to end-to-end parameter measurement management for a network management system (NMS) of a packet-oriented communications network including a multiplicity of peripheral equipments (EP). The parameter measurement management system (DGM) comprises management means (MG) adapted to send selected peripheral equipments (EP) selected filter definitions associated with selected filter identifiers, correlation means (MCN) adapted to correlate each notification including a selected filter identifier received from an ingress peripheral equipment (EP-1) with a selected set of notifications received from egress peripheral equipments (EP-2, EP-3) and including a filter identifier having one or more relationship links with the selected filter identifier, and calculation means (MCM) adapted to derive parameter measurements from values contained in the correlated notifications.

15 Claims, 1 Drawing Sheet

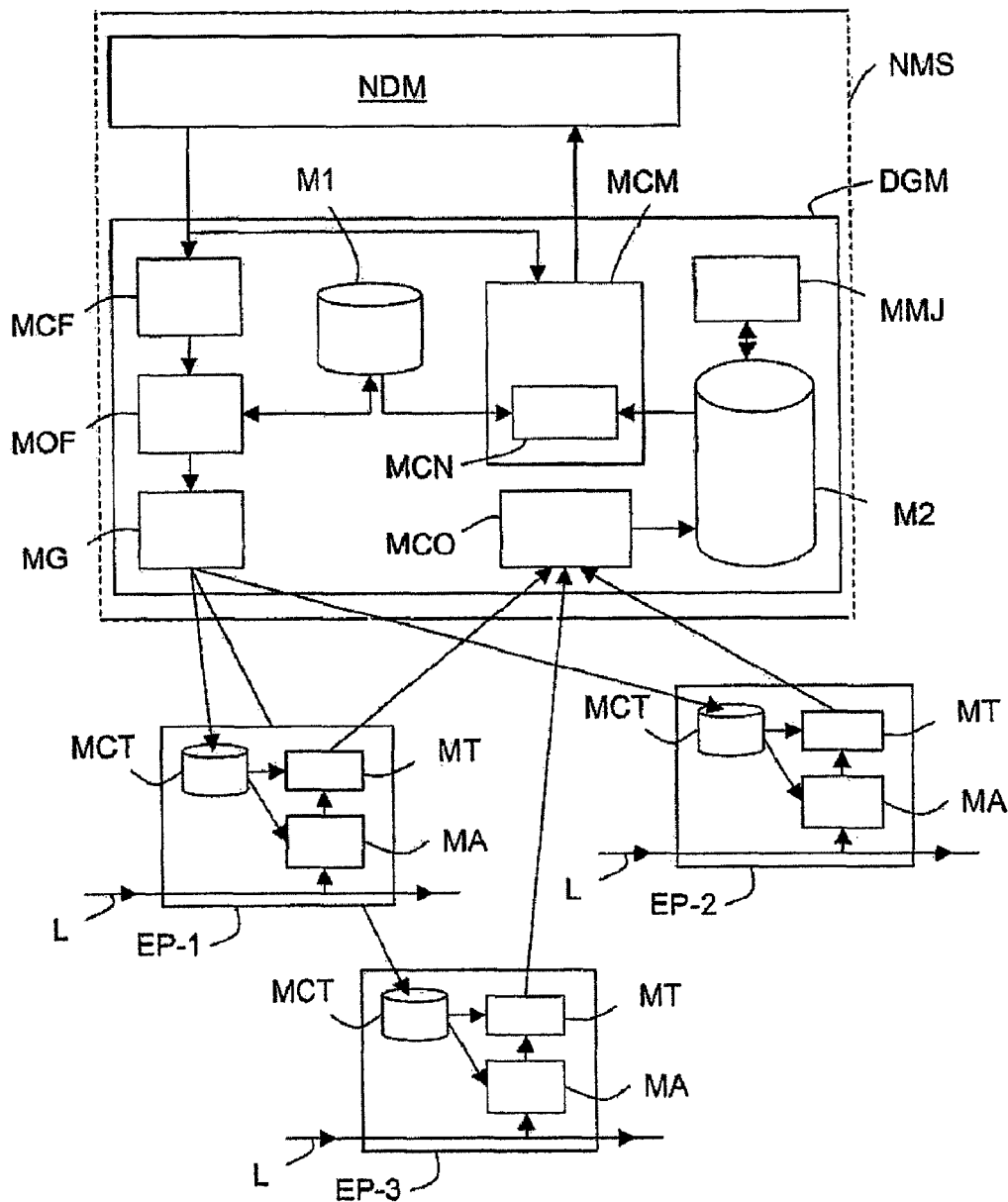
FIGURE

CORRELATING END-TO-END PASSIVE MEASUREMENTS USING HIERARCHICAL FILTERS

BACKGROUND

The invention relates to the field of managed packet-oriented communications networks, and to be more precise it relates to obtaining passive measurements of end-to-end traffic parameters within such networks.

In the present context, the term "measurements" refers to measurements relating to network management and to measurements relating to service management, and in particular to quality of service (QoS) management.

Moreover, in the present context, the term "traffic" applies equally to flows of data packets and to data packets of a flow, and the expression "end-to-end traffic" means traffic passing right through a set of networks, a particular network or one or more domains or subdomains of a multidomain context network.

As the person skilled in the art is aware, the operators of managed networks frequently need to obtain values of traffic parameters or characteristics, such as jitter, packet loss rate, and transmission delay, and to do so with a certain amount of accuracy, in order to be able to monitor the operation of their networks. This enables them in particular to monitor the quality of service (QoS) guaranteed to their customers in service level agreements (SLA).

Traffic parameter values can be obtained actively or passively at certain network elements (equipments). The invention relates specifically to passive measurements on real traffic to be monitored.

These passive measurements determine the actual characteristics of real traffic and they require a large volume of data to be collected from the network peripheral equipments that constitute the ingress and egress points of the traffic (flows), followed by correlation of all the data collected.

In order to avoid overloading the network in terms of resources used by the quasipermanent increase in the volume of data that is collected, it has in particular been proposed to provide a branch connection to a traffic analysis unit for filtering and sampling the measurement data on each transmission link of each peripheral equipment, e.g. each router. This undoubtedly results in a significant reduction in the amount of measurement data sent to the network manager, but at the same time significantly reduces the accuracy of the measurements.

An object of the invention is to improve on this situation.

BRIEF DESCRIPTION

To this end the invention proposes a system dedicated to managing the filtering of traffic (flows of data) for a peripheral equipment of a packet-oriented communications network, the system comprising traffic analysis means adapted to determine representative values of selected received traffic parameters as a function of one or more selected traffic filters and to send the values in the form of notifications to a network management system of the network for it to determine measurements of the selected parameters.

This filtering management system is characterized in that it comprises control means adapted to supply each selected traffic filter to traffic analysis means, and processing means adapted to add a selected filter identifier to each notification generated by the analysis means following a traffic analysis corresponding to the selected filter, and before it is sent to the network management system.

The invention also proposes peripheral equipment for a packet-oriented communications network, comprising traffic analysis means adapted to determine representative values of selected received traffic parameters as a function of one or more selected traffic filters and to send the values in the form of notifications to a network management system of said network for it to determine measurements of said selected parameters, which equipment is characterized in that it comprises a traffic filtering management system of the above kind.

The invention further proposes an end-to-end parameter measurement management system for a network management system of a packet-oriented communications network including a multiplicity of peripheral equipments of the above kind, said parameter measurement management system including calculation means adapted to derive parameter measurements from representative values of said parameters contained in notifications coming from ingress peripheral and egress peripheral equipments, which system is characterized in that it comprises management means adapted to send selected peripheral equipments selected filter definitions associated with selected filter identifiers, and correlation means adapted to correlate each notification including a selected filter identifier received from an ingress peripheral equipment with a selected set of notifications received from egress peripheral equipments and including a filter identifier having one or more relationship links with said selected filter identifier so that said calculation means are able to derive parameter measurements from values contained in said correlated notifications.

The above system may have the following additional features, separately or in combination:

configuration means adapted to define the filters as a function of identifiers of flows of traffic to be filtered and a designation of the ingress and the egress peripheral equipments at which the filters must be used, scheduling means adapted to assign to each filter the associated identifier, first memory means coupled to the correlation means and adapted to store the filters in accordance with a hierarchy taking account of their relationship links and in corresponding relationship to their respective filter identifiers; in this case, the scheduling means are preferably adapted to establish the hierarchy between the filters and to communicate to the first memory means the hierarchically organized flows and the associated filter identifiers, collection means adapted to receive the notifications from the ingress and egress peripheral equipments and to classify the received notifications as a function of their source, second memory means coupled to the collection means and the correlation means and adapted to store the notifications as a function of their source, the correlation means may be adapted to extract from the second memory means an ingress notification whose source corresponds to a selected ingress peripheral equipment, then to determine the filter identifiers in the first memory means having a relationship link with the filter identifier of the extracted notification, and then to extract from the second memory means the egress notifications whose source corresponds to an egress peripheral equipment and including a filter identifier having a relationship link with that of the ingress notification previously extracted, in order to correlate the ingress and egress notifications; in this case, for the purposes of correlation, the correlation means may be adapted to select certain of the egress notifications stored in the second memory means as a function of information contained in a flow matrix, updating means adapted to eliminate from the second memory means each egress notification corresponding to a transmission time of day before the transmission time of day of an ingress notification correlated by the correlation means, and elimination mean adapted to eliminate from the second memory means ingress notifications received within a predetermined time.

The invention finally proposes a network management system for a packet-oriented communications network including a multiplicity of peripheral equipments of the above kind and comprising a parameter measurement management system of the above kind.

The invention is particularly, although not exclusively, suitable for Internet Protocol (IP) communications networks and IP/(G)MPLS networks.

BRIEF DESCRIPTION OF THE DRAWINGS

Other features and advantages of the invention will become apparent on reading the following detailed description and examining the appended drawing.

FIGURE illustrates a diagram of an exemplary embodiment of a network management system including a parameter measurement management system of the invention coupled to a plurality of network equipments including a filtering management system of the invention.

The appended drawings constitute part of the description of the invention and may, if necessary, contribute to the definition of the invention.

DETAILED DESCRIPTION

An objective of the invention is to enable the passive measurement of end-to-end traffic parameters within a managed packet-oriented communications network.

The communications network considered hereinafter is an Internet Protocol (IP) network, i.e. a multidomain context network consisting of interconnected IP domains and/or subdomains. However, the invention is not limited to this type of managed network alone. It relates equally and in particular to IP/(G)MPLS networks.

Broadly speaking, although in sufficient detail to explain the invention, an IP network may be regarded as a set of access equipments, such as nodes, connected to each other directly or indirectly to enable communications terminals and/or networks to interface each other.

In the present context, the term "access equipment" (network equipment) refers in particular to core routers and to edge routers of the type shown diagrammatically in the single FIGURE.

Moreover, the expression "communications terminal" refers to any network equipment capable of exchanging packets of data, for example a portable or fixed computer, a fixed or mobile telephone, a personal digital assistant (PDA), or a server.

Communications terminals are usually connected to an edge router EP, which serves as their access node to the IP network, and the edge routers EP are generally connected to each other via one or more core routers.

In an IP network, each domain or subdomain has its own edge routers and its own core routers. In an IP/(G)MPLS network, the network equipments are called "label switch routers" and take the form of routers or ATM switches controlled by a routing function.

The invention relates to peripheral equipments EP of the network, which are edge routers, for example. However, it relates equally to network elements such as interfaces, in particular those situated on top of the IP or MPLS stacks of each physical interface.

In the present example, only three peripheral equipments EP-1 to EP-3 are represented, but there can be any number of them greater than or equal to two.

As shown in the FIGURE, in an IP network the network equipments, and in particular the peripheral equipments EP, are coupled to a network management system (NMS), also referred to as a network operating system, which in particular enables the network manager (or supervisor) to manage the network equipments that constitute the network. To this end, the network equipments are adapted to exchange data with the NMS using a network management protocol such as the Simple Network Management Protocol (SNMP) of RFC 2571-2580.

As indicated hereinabove, an objective of the invention is to enable passive measurement of selected parameters of end-to-end traffic.

The term "end-to-end traffic" refers to a flow of data packets or to data packets of a flow that passes completely through a plurality of networks, a network or one or more domains or subdomains of a multidomain context network, such as an IP network. In the present context, the expression "passes completely through" refers to entering a network or a domain through one of its edge routers EP, referred to as the "ingress router", for example the router EP-1, and leaving it via another of its edge routers EP, referred to as the "egress router", for example the router EP-2 or EP-3.

The end-to-end measurements are effected at two end points of the network, regardless of what lies between the two measurement points. Consequently, the two measurement points can be placed at the two ends of a network, a federation of networks or one or more domains of a multidomain network.

Representative values of end-to-end traffic parameters are determined by analyzing either flows of data packets or the data packets themselves at the edge routers EP of the IP network. These values are sent to the NMS in the form of notifications.

Hereinafter, by way of illustrative example, the passive measurements that are analyzed relate to end-to-end traffic parameters regarding quality of service (QoS), and more particularly to quality of service management.

Each edge router EP to which end-to-end measurements relate includes a traffic analysis module MA (also known as an observation agent) for determining representative values of selected parameters of end-to-end traffic sent to it. These analyses are passive in the sense that they relate to real traffic. For example, they relate to jitter on the IP network, the transmission delay, the number of lost packets or the rate of loss of packets.

The analysis module MA is preferably installed in the edge router EP, but may equally well be connected thereto.

In a conventional edge router, the analysis module MA is adapted to send the values that it determines to a calculation module of the NMS installed, for example, in a measurement management system (constituting a processing stage), such as a management server. Using mathematical models well known to the person skilled in the art and referred to as "metrics", a calculation module of this kind measures the parameters of end-to-end traffic represented by values received from the edge routers EP to which the traffic relates. The calculation module is generally able not only to measure parameters but also to determine associated statistics (maximum, minimum, mean value, mean variation, standard deviation, etc.). Moreover, the calculation module is generally connected to a graphical user interface (GUI) of the NMS, enabling the NMS to send it the metrics and to display measurement results on a screen in real time or off-line.

According to the invention, and as shown in the FIGURE, the measurement management system DGM of the network management system NMS includes not only a calculation module MCM but also a management module MG, for sending to selected peripheral equipments EP selected filter definitions associated with selected filter identifiers, and a correlation module MCN, for correlating each notification received from an ingress peripheral equipment EP-1 with a selected set of notifications received from egress peripheral equipments EP-2, EP-3.

To be more precise, according to the invention, each notification sent by an edge equipment (router) EP includes not only a value representative of a selected parameter but also an identifier of the filter used by the analysis module MA to determine that value.

Each edge router EP to which the end-to-end measurements relate is adapted to filter (or sample) end-to-end traffic received via the input interfaces IE as a function of filter definitions sent by the management module MG of the measurement management system DGM of the network management system NMS, in order to send filtered traffic to the analysis module MA. The other traffic continues on its way and leaves the router via its output interfaces. In other words, the analysis module MA analyses only filtered traffic (flows and/or packets) sent to it.

Packet flow filtering consists in selecting certain flows from all those received over the input interfaces. The ingress edge router (EP-1 in this example) and the egress edge router (EP-2 or EP-3 in this example) to which the measured end-to-end traffic relates must filter (or select) the same flow or flows.

Flow filtering generally consists in sampling flows as a function of the class to which they belong. In the present context the expression "flow class" refers to flows including, in the case of the Internet Protocol (IP), the same DSCP field, the same SRC/DST fields or the same DSCP/SRC/DST fields, for example. Other IP fields may equally be used, for example those containing the source ports and the destination ports.

For example, flow sampling consists in analyzing the class to which belong flows with one or more selected protocol levels (IP, UDP/TCP, HTTP, etc.).

The analysis may therefore apply to the contents of fields placed in the header of packets belonging to the received flows, for example fields dedicated to the class of the flow (used to distinguish flows belonging to different subdomains or domains of the IP network). These class fields generally include a source domain identifier, a destination domain identifier, a DSCP identifier and a transmission protocol identifier.

The contents of the above fields are then compared to the contents of the class fields defined by the filter definitions, after which the contents of the flow identification fields of a given class (used to distinguish flows of the same type) are compared to the contents of the flow identification fields defined by the filter definitions. Of course, this is merely one example of analysis. Other fields of higher level protocols can be analyzed, for example the TCP and HTTP over TCP/IP level.

Packet filtering generally consists in sampling packets belonging to one or more flows of a selected class.

According to the invention, each edge equipment EP to which end-to-end measurements relate comprises, in addition to its analysis module MA, a control module MCT for supplying to the traffic analysis module MA one or more selected filters sent by the management module MG of the measurement management system DGM in the form of filter definitions each associated with a filter identifier. Each peripheral equipment EP further comprises a processing module MT coupled to its control module MCT and its analysis module MA for adding the associated filter identifier to each notification generated by the analysis module MA, following a traffic analysis corresponding to a selected filter and before the notification is sent to the measurement management system DGM of the network management system NMS.

In the present context the term "adding" refers to adding to a notification a field including a value representative of the filter used, for example in its header.

The filter definitions sent selectively by the management module MG to the edge equipments EP of the IP network can be supplied directly to said management module MG by the network supervisor via the graphical user interface. However, as shown here, it is preferable for the measurement management system DGM to comprise a configuration module MCF for defining the various filters. The filter definitions can therefore be produced as a function of information supplied by the network supervisor via the graphical user interface. That information comprises, for example, identifiers of flows of traffic to be filtered and designations of the ingress peripheral equipment (EP-1) and the egress peripheral equipments (EP-2, EP-3) at which the filters must be used.

The definitions are preferably generated by the configuration module MCF when the NMS sends it a specific end-to-end measurement request.

Moreover, as shown here, it is equally preferable for the measurement management system DGM to comprise a scheduling module MOF for assigning a filter identifier to each flow definition supplied by the configuration module MCF to which it is connected at the time, for example, in exactly the same way as one is assigned to the management module MG.

The scheduling module MOF is additionally and preferably responsible for establishing a hierarchy between flows that advantageously takes account of relationship links that exist between certain flows.

There follows an illustrative example of the above hierarchical classification:

Filter 1: @SRC between 192.168.30.0 and 192.168.30.255

Filter 2: @SRC between 192.168.30.10 and 192.168.30.20

Filter 3: @SRC between 192.168.30.21 and 192.168.30.30

In this example, filters 2 and 3 constitute subsets of filter 1. There is therefore a relationship link, on the one hand, between filter 1 and filter 2 and, on the other hand, between filter 1 and filter 3.

This hierarchical classification is intended in particular to reduce the number of filters to be implemented in each peripheral equipment EP. By comparing the definitions of the various filters to be implemented in the same peripheral equipment EP, it is possible to determine the filter(s) constituting subsets of another filter in order to deploy only the filter(s) that have no relationship link with another filter. For example, in the situation referred to above, only filter 1 will be deployed in the peripheral equipment EP concerned, and not filter 2, which constitutes a subset of it, regardless of the filtering criterion used in filter 2 (destination addresses, DSCP field, etc.).

A first memory M1 coupled to the scheduling module MOF stores the hierarchical filter definitions in corresponding relationship to their respective filter identifiers. It is important to note that a unique filter identifier corresponds to each filter definition.

In the measurement management system DGM of the invention, the scheduling module MOF therefore supplies the management module MG with the filter definitions associated with the respective identifiers and the management module MG sends the filter definitions and the associated identifiers to the peripheral equipments EP concerned, taking account of instructions from the IP network supervisor.

To collect the notifications sent by the peripheral equipments EP, to be more precise by their respective processing modules MT, the measurement management system DGM of the invention preferably comprises a collection module MCO that preferably also classifies ingress and egress notifications received from the ingress peripheral equipment (EP-1) and the egress peripheral equipments (EP-2, EP-3) as a function of their respective sources.

The source of a notification determines if the filtered flow associated with the filter identifier that it contains is an incoming flow, i.e. a flow reaching an ingress peripheral equipment, or an outgoing flow, i.e. a flow reaching an egress peripheral equipment.

The notifications classified in the above manner are preferably stored as a function of their respective sources in a second memory M2 coupled to the collection module MCO. For example, the second memory M2 is divided into areas each dedicated to notifications from the same peripheral equipment EP. Each area may be divided into a subarea dedicated to ingress notifications and a subarea dedicated to egress notifications.

The correlation module MCN of the measurement management system DGM is coupled either to the second memory M2 or to the collection module MCO if there is no second memory M2.

As previously indicated, the correlation module MCN correlates each ingress notification from an ingress peripheral equipment, for example the equipment EP-1, with a selected set of egress notifications from egress peripheral equipments, for example the equipment EP-2 and/or EP-3. To be more precise, the correlation module MCN correlates each ingress notification with a selected set of egress notifications each including a relationship link with the filter identifier contained in the ingress notification.

To this end, the correlation module MCN first extracts from the second memory M2 an ingress notification whose origin corresponds to an ingress peripheral equipment through which traffic to be measured has passed, for example the equipment EP-1. It then determines the filter identifier associated with that ingress notification in order to determine all the filter identifiers in the first memory M1 that have a relationship link with the filter identifier of the ingress notification. This is facilitated by the hierarchical classification of the filter definitions in the first memory M1.

The correlation module MCN then extracts from the second memory M2 egress notifications that include all the filter identifiers having a relationship link with that of the ingress notification, in order to correlate them with the ingress notification. This correlation consists in grouping each egress notification corresponding to a flow that was the subject of an ingress notification and to a transmission time of day after the transmission time of day of the ingress notification, so that the calculation module MA can effect an end-to-end measurement on the basis of parameter values contained in the correlated notifications and the appropriate calculation algorithm (metric). The measurements are then sent to a measurement management stage NDM of the network management system NMS.

To facilitate correlation, the correlation module MCN can select some of the egress notifications stored in the second memory M2 as a function of information contained in a flow matrix. A flow matrix of this kind defines relations between peripheral equipments EP. For example, in an IP virtual private network (VPN), the flow matrix specifies for packets belonging to a given VPN the peripheral equipments that constitute ingress and egress points of that VPN.

Thanks to this flow information, the correlation module MCN can significantly reduce the number of areas of the second memory M2 it has to search for ingress notifications including filter identifiers having a relationship link with the filter identifier of an ingress notification.

In the embodiment shown, the correlation module MCN is part of the calculation module MCM, but this is not obligatory. It can be independent of the calculation module MCM but coupled thereto to supply it with correlated notifications.

The measurement management system DGM according to the invention can also comprise an updating module MMJ coupled to the second memory M2 to observe the content thereof in order to eliminate, preferably automatically, each egress notification that corresponds to a transmission time of day before the transmission time of day of an ingress notification that has been correlated by the correlation module MCN. This means that notifications can be eliminated as and when they are processed, which avoids overloading the second memory M2 unnecessarily as well as facilitating correlation.

In addition to or instead of the updating module MMJ, the measurement management system DGM of the invention can also comprise an elimination module (not shown) coupled to the second memory M2 for analyzing the times of day associated with received ingress notifications in order to eliminate from the second memory M2 ingress notifications whose associated times of day expired within a predetermined time period (or delay). For example, the elimination module can include one or more timers for counting down the elapsed time and delivering a signal triggering elimination each time that the elapsed time is equal to a predetermined time.

The filter management system DGF of the invention, and in particular its control module MCT and its processing module MT, the parameter measurement management system DGM, and in particular its management module MG, its calculation module MCM, its configuration module MCF, its scheduling module MOF, its correlation module MCN, its collection module MCO and its updating module MMJ, and where applicable its first memory M1 and its second memory M2, and the network management system NMS can all be implemented in the form of electronic circuits, software (or data processing) modules, or a combination of circuits and software.

The invention enables the deployment of a large number of traffic analysis "probes" without this penalizing the network in terms of the use of resources to send notifications. Moreover, the number of notifications to be correlated being significantly smaller, it is possible to effect end-to-end measurements in real time and to reduce the cost of the processors of the calculation module. The invention also significantly reduces the number of filters installed in the peripheral equipments.

The invention is not limited to the embodiments of a filter management system, measurement management system and network management system described hereinabove by way of example only, and encompasses all variants that the person skilled in the art might envisage that fall within the scope of the following claims.

What is claimed is:

1. An end-to-end parameter measurement management system for a network management system of a packet-oriented communications network including a multiplicity of peripheral pieces of equipment, each comprising:
   traffic analysis means for determining representative values of selected received traffic parameters as a function of one or more selected traffic filters and sending the values as notifications to the network management system to determine measurements of the selected parameters;
   control means for supplying each selected traffic filter to the traffic analysis means; and
   processing means for adding a selected filter identifier to each notification generated by the traffic analysis means following a traffic analysis corresponding to the selected filter, and before each notification is sent to the network management system; and wherein
   said parameter measurement management system includes:
   calculation means for deriving parameter measurements from the representative values of said parameters contained in the notifications received from an ingress piece of peripheral equipment and an egress piece of peripheral equipment;
   management means for sending selected filter definitions associated with the selected filter identifiers to selected pieces of peripheral equipment; and
   correlation means for correlating each notification including the selected filter identifier received from the ingress piece of peripheral equipment with a selected set of egress notifications received from the egress piece of peripheral equipment which each egress notification includes a filter identifier having one or more relationship links with said selected filter identifier so that said calculation means derives parameter measurements from the representative values contained in said correlated notifications.

2. The system according to claim 1, further comprising:
   configuration means for defining said filters as a function of identifiers of flows of traffic to be filtered and a designation of the ingress piece of peripheral equipment and the egress pieces of peripheral equipment at which said filters are to be used.

3. The system according to claim 1, further comprising:
   scheduling means for assigning to each filter an associated identifier.

4. The system according to claim 3, further comprising:
   first memory means coupled to said correlation means for storing said filters in accordance with a hierarchy based on relationship links of the filters and respective filter identifiers, wherein said scheduling means is adapted to establish said hierarchy between said filters and to communicate to said first memory means said hierarchically organized flows and the associated filter identifiers.

5. The system according to claim 1, further comprising:
   first memory means coupled to said correlation means for storing said filters in accordance with a hierarchy based on relationship links of the filters and respective filter identifiers.

6. The system according to claim 1, further comprising:
   collection means for receiving said notifications from the ingress piece of peripheral equipment and the egress piece of peripheral equipment and classifying each received notification as a function of a respective source.

7. The system according to claim 6, further comprising:
   second memory means coupled to said collection means and said correlation means for storing said notifications as the function of the respective source.

8. The system according to claim 7, wherein said correlation means is adapted:
   to extract from said second memory means an ingress notification whose source corresponds to a selected ingress piece of peripheral equipment,
   to determine the filter identifiers in said first memory means having a relationship link with the filter identifier of the extracted ingress notification, and
   to extract from said second memory means the egress notifications whose source corresponds to the egress piece of peripheral equipment which egress notifications include a filter identifier having a relationship link with that of the ingress notification previously extracted, to correlate said ingress and egress notifications.

9. The system according to claim 8, wherein said correlation means is adapted to select certain egress notifications stored in said second memory means as a function of information contained in a flow matrix.

10. The system according to claim 7, further comprising:
    updating means for eliminating from said second memory means each egress notification corresponding to a transmission time before the transmission time of the ingress notification correlated by said correlation means.

11. The system according to claim 7, further comprising:
    elimination means for eliminating from said second memory means the ingress notifications received within a predetermined time.

12. A network management system for a packet-oriented communications network including a multiplicity of pieces of peripheral equipment, each comprising:
    traffic analysis means for determining representative values of selected received traffic parameters as a function of one or more selected traffic filters and sending the values as notifications to the network management system to determine measurements of the selected parameters;
    control means for supplying each selected traffic filter to the traffic analysis means; and
    processing means for adding a selected filter identifier to each notification generated by the traffic analysis means following a traffic analysis corresponding to the selected filter, and before each notification is sent to the network management system;
    the network management system comprising an end-to-end parameter measurement management system including:
    calculation means for deriving parameter measurements from the representative values of said parameters contained in the notifications received from an ingress piece of peripheral equipment and egress piece of peripheral equipment;
    management means for sending to selected piece of peripheral equipment selected filter definitions associated with selected filter identifiers; and
    correlation means for correlating each notification including a selected filter identifier received from an ingress piece of peripheral with a selected set of egress notifications received from the egress piece of peripheral equipment which each egress notification includes a filter identifier having one or more relationship links with said selected filter identifier so that said calculation means derives parameter measurements from the representative values contained in said correlated notifications.

13. The system according to claim 1, wherein the processing means adds the filter identifier to the notification by adding to the notification a field comprising a value related to the selected filter.

14. A system for measuring selected parameters of an end-to-end traffic in a packet-oriented communications network between an ingress piece of peripheral equipment and an egress piece of peripheral equipment, the system comprising:

management means for sending selected traffic filters including filter definitions associated with selected filter identifiers including ingress and egress filter identifiers which are respectively sent to the ingress piece of peripheral equipment or the egress piece of peripheral equipment;

traffic analysis means for performing traffic analysis, determining representative values of selected traffic parameters as a function of the selected traffic filters and generating notifications including the determined representative values, wherein the notifications include ingress and egress notifications which originate, correspondingly, at the ingress piece of peripheral equipment and the egress piece of peripheral equipment;

processing means for adding the respective ingress filter identifier or egress filter identifier into each corresponding ingress or egress notification generated by the traffic analysis means following the traffic analysis;

a relationship link included at least in one of the ingress filter identifier to point to a respective egress filter identifier and the egress filter identifier to point to a respective ingress filter identifier;

correlation means for correlating the ingress notifications with the egress notifications based on the relationship link; and calculation means for determining measurements of the selected parameters based on the notifications.

15. The system according to claim 14, wherein the calculation means determines the parameter measurements from the representative values contained in the correlated notifications.

* * * * *

UNITED STATES PATENT AND TRADEMARK OFFICE
CERTIFICATE OF CORRECTION

PATENT NO.        : 7,590,062 B2                                          Page 1 of 1
APPLICATION NO.  : 11/113991
DATED             : September 15, 2009
INVENTOR(S)       : Delegue et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1177 days.

Signed and Sealed this

Twenty-first Day of September, 2010

David J. Kappos
*Director of the United States Patent and Trademark Office*